Figure 1:
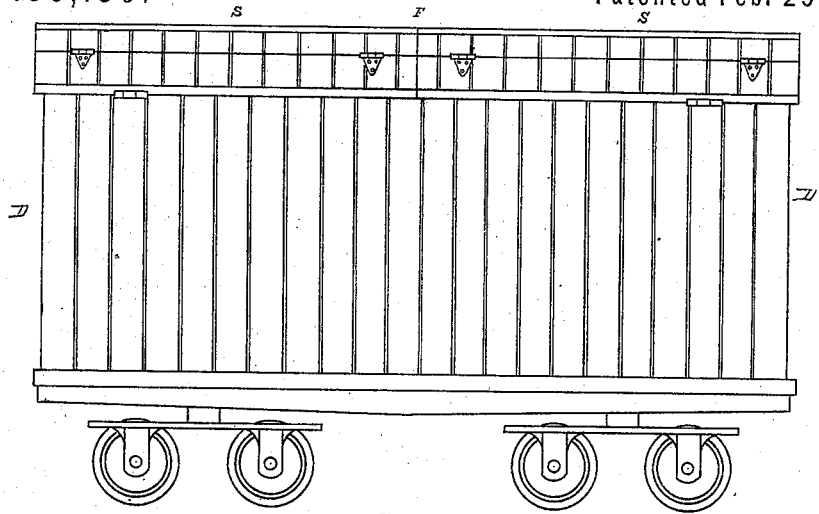

E. D. GIRD.
Apparatus for Cooling and Transporting Milk.
No. 136,150. Patented Feb. 25, 1873.

Witnesses.
Walter R. Colton
Wm James Dodge

Inventor.
Edward D. Gird

E. D. GIRD.
Apparatus for Cooling and Transporting Milk.
No. 136,150. Patented Feb. 25, 1873.

UNITED STATES PATENT OFFICE.

EDWARD D. GIRD, OF SYRACUSE, NEW YORK.

IMPROVEMENT IN APPARATUS FOR COOLING AND TRANSPORTING MILK.

Specification forming part of Letters Patent No. 136,150, dated February 25, 1873.

*To all whom it may concern:*

Be it known that I, EDWARD D. GIRD, of Syracuse, in the county of Onondaga and State of New York, have invented certain Improvements in Railway Cars for Cooling and Conveying Milk, of which the following is a specification:

My invention consists of a refrigerator and conveyer, which, by its easy adaptation to railroad cars or other vehicles, affords a safe, cheap, and convenient mode of transporting milk or other substances requiring a reduced temperature for their preservation. Its construction consists of a longitudinal metallic cylinder, of any suitable capacity and of the length of an ordinary railroad car, and is closed on both its ends, thus forming a tank for the reception of milk or other substances to be transported. One end of this tank is provided with an opening of sufficient size to admit of entrance for cleaning purposes, which opening is closed and securely fastened by a cap fitted with a screw, and is provided with two projections or pins for its convenient operation by a lever. A pipe is attached to the lower part of the same end of the cylinder or tank, and serves to draw off the milk or other substance, and is provided with a stopcock or other suitable device. For the reception of the milk or other substance an opening is made at the top of the tank, and preferably at the center, and surmounted by a short pipe of any desirable size, and fitted with a cap or cover. A metallic cap-shaped follower, used to keep the milk or other substance from too violent agitation, is inserted through the described opening, and is made to fit the inside of the pipe loosely, so as to enable it to follow the milk as it contracts in the process of cooling, and rests upon the surface of the milk.

The inside of the tank may be coated with a suitable material to prevent the chemical action caused by the contact of the milk with the metal.

My invention further tends to refrigerate the liquid contained in the tank, and I provide for that purpose a metallic box or case, inclosing the upper half of the cylinder or tank securely attached thereto, and extending above the same to the roof of the car. It is supported by its ends resting upon the ends of the tank or cylinder, and its sides taper toward the sides of the cylinder and terminate at a point a little below the center of the same. This box or refrigerator is intended to be filled with ice, introduced at its top. Doors or lids are hinged to the sides of this box along its top, thus forming a movable lid or cover to the same. One of these doors or covers is divided along its entire length and hinged, enabling it to be folded back for more conveniently operating the same.

The shape of my refrigerator enables the ice to cover and cool about two-thirds of the tank containing the milk, and the water produced by the melting ice effectually refrigerates the remainder. The greatest degree of cold being at the top causes the cooled milk to descend to the bottom of the tank, while the warmer rises, thus producing a continuous current and refrigerating action.

My tank and refrigerator is adapted to an ordinary platform-car, and secured to the same by metallic bands encircling the cylinder, and secured at their ends to the platform of the car.

I surround my tank and refrigerator with an outer wooden box of the shape of an ordinary car-body, thereby more effectually preventing the rapid melting of the ice, and giving the whole an improved exterior appearance. This exterior box is provided at its top with lids or doors for the purpose of introducing the ice, constructed in the same manner as those of the metallic refrigerator already described. An opening is left at the end of the box or car-body to admit of removing the tank-head when desired.

Figure 2:
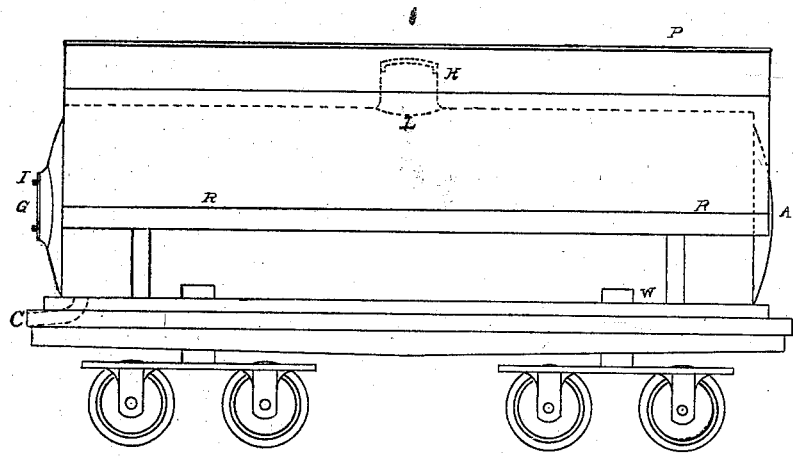
Figure 3:
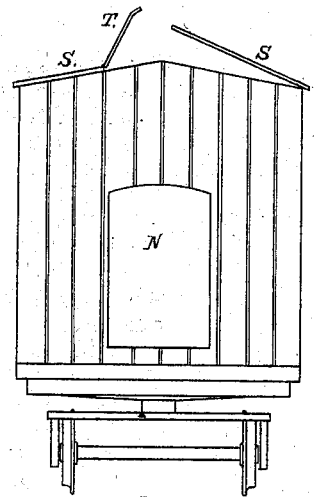
Figure 4:
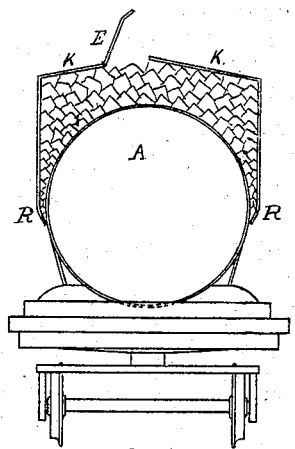
Figure 5:
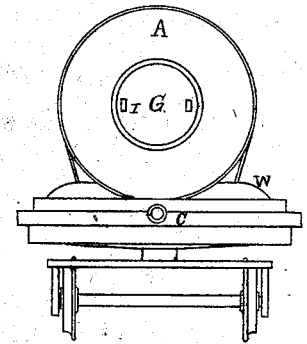
Figure 6:
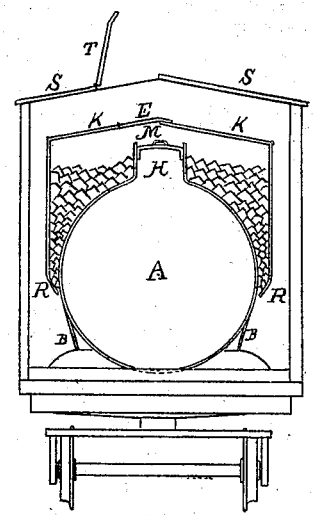

In the accompanying drawing, Figure 1 represents a side elevation of the car containing the tank and refrigerator with the doors of the outer box raised. Fig. 2 represents a longitudinal view of the same with the outer box or car-body removed. Fig. 3 represents an end view of the exterior box or car-body with its doors raised, and showing the opening in the end. Fig. 4 represents a sectional end view of the tank and refrigerator or ice-box. Fig. 5 represents an end view of the tank, showing the adjustable cap or head. Fig. 6 represents a sectional view, showing the tank, refrigerator, and exterior, with follower, and raised doors or covers, and metallic fastening-bands.

The metallic cylinder or tank A is supported by an ordinary railroad car, to which it is securely held by metallic bands B B, and provided with a cap or head, G, projections or pins I I, and pipe C at one end. The upper part of the tank A is surmounted at its center by a cap, H, covering a pipe and opening, L, into which is introduced the follower M, as shown in Fig. 2. The upper part of the cylinder A is inclosed by a metallic refrigerator or ice-box, P, with its sides inclined toward the tank A, leaving an opening, R R, along the whole length of the same. The refrigerator P is provided at its top with lids or doors K K E. The whole is surrounded by a wooden box, D, as shown in Fig. 1, provided with lids or doors S S T, which form the car-roof, and an opening, N, as shown in Fig. 3 of the drawing, and a subdivision, F, of the roof, as shown in Fig. 1.

Having thus described my invention, what I claim, and desire to secure by Letters Patent, is—

1. The combination of the tank A and the ice-box P, constructed substantially as described, and for the purpose specified.

2. The milk-tank A, ice-box P, and casing D, in combination with a suitable platform-car, the whole constructed and arranged substantially as specified.

EDWARD D. GIRD.

Witnesses:
H. G. MATTESON,
JAS. S. PLUMB.